US012593113B1

(12) United States Patent (10) Patent No.: US 12,593,113 B1

Wang et al. (45) Date of Patent: Mar. 31, 2026

(54) SYSTEMS AND METHODS FOR GENERATING PERSONALIZED RECOMMENDATION EXPLANATIONS

(71) Applicant: Netflix, Inc., Los Gatos, CA (US)

(72) Inventors: Nan Wang, San Jose, CA (US); Linas Baltrunas, San Jose, CA (US); Hakan Ceylan, Menlo Park, CA (US); Erik Michael Schmidt, Oakland, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 18/904,663

(22) Filed: Oct. 2, 2024

(51) Int. Cl.
| | |
|---|---|
| *H04N 21/84* | (2011.01) |
| *G06F 16/735* | (2019.01) |
| *G06N 20/00* | (2019.01) |
| *H04N 21/466* | (2011.01) |

(52) U.S. Cl.
CPC .......... *H04N 21/84* (2013.01); *G06F 16/735* (2019.01); *G06N 20/00* (2019.01); *H04N 21/4668* (2013.01)

(58) Field of Classification Search
CPC .......... H04N 21/4668; H04N 21/4826; H04N 21/466; H04N 21/4667; H04N 21/251
See application file for complete search history.

(56) References Cited

U.S. PATENT DOCUMENTS

| | | | | |
|---|---|---|---|---|
| 8,260,117 B1 * | 9/2012 | Xu | ..................... | H04N 21/4668 386/343 |
| 2008/0082921 A1 * | 4/2008 | Negi | .................. | H04N 21/6582 715/704 |
| 2020/0007937 A1 | 1/2020 | Polatkan et al. | | |
| 2020/0302820 A1 * | 9/2020 | Sherman | .................. | G09B 7/02 |
| 2024/0104305 A1 * | 3/2024 | Glesinger | ............ | G06V 10/421 |
| 2025/0175660 A1 * | 5/2025 | Min | ..................... | H04N 21/466 |

OTHER PUBLICATIONS

International Search Report and Written Opinion for PCT Application No. PCT/US2025/046166 mailed Jan. 14, 2026; 10 pages.

* cited by examiner

*Primary Examiner* — Jason Salce
(74) *Attorney, Agent, or Firm* — Greenberg Traurig, LLP

(57) ABSTRACT

The disclosed computer-implemented method may include receiving, by a computing device, a request to generate an explanation of a recommendation to a user, wherein the request includes a recommended title and a profile history of the user. The method may include selecting a set of previous titles from the profile history that exceeds a threshold similarity score. Additionally, the method may include extracting, by fetching descriptive information about each previous title, a set of keywords. The method may also include automatically prompting, based on the set of keywords, a generative artificial intelligence (AI) model to generate the explanation of the recommendation using the set of previous titles. Furthermore, the method may include performing a safety check to filter the generated explanation. Finally, the method may include sending the recommendation and the explanation to a client device of the user. Various other methods, systems, and computer-readable media are also disclosed.

20 Claims, 10 Drawing Sheets

Method
100

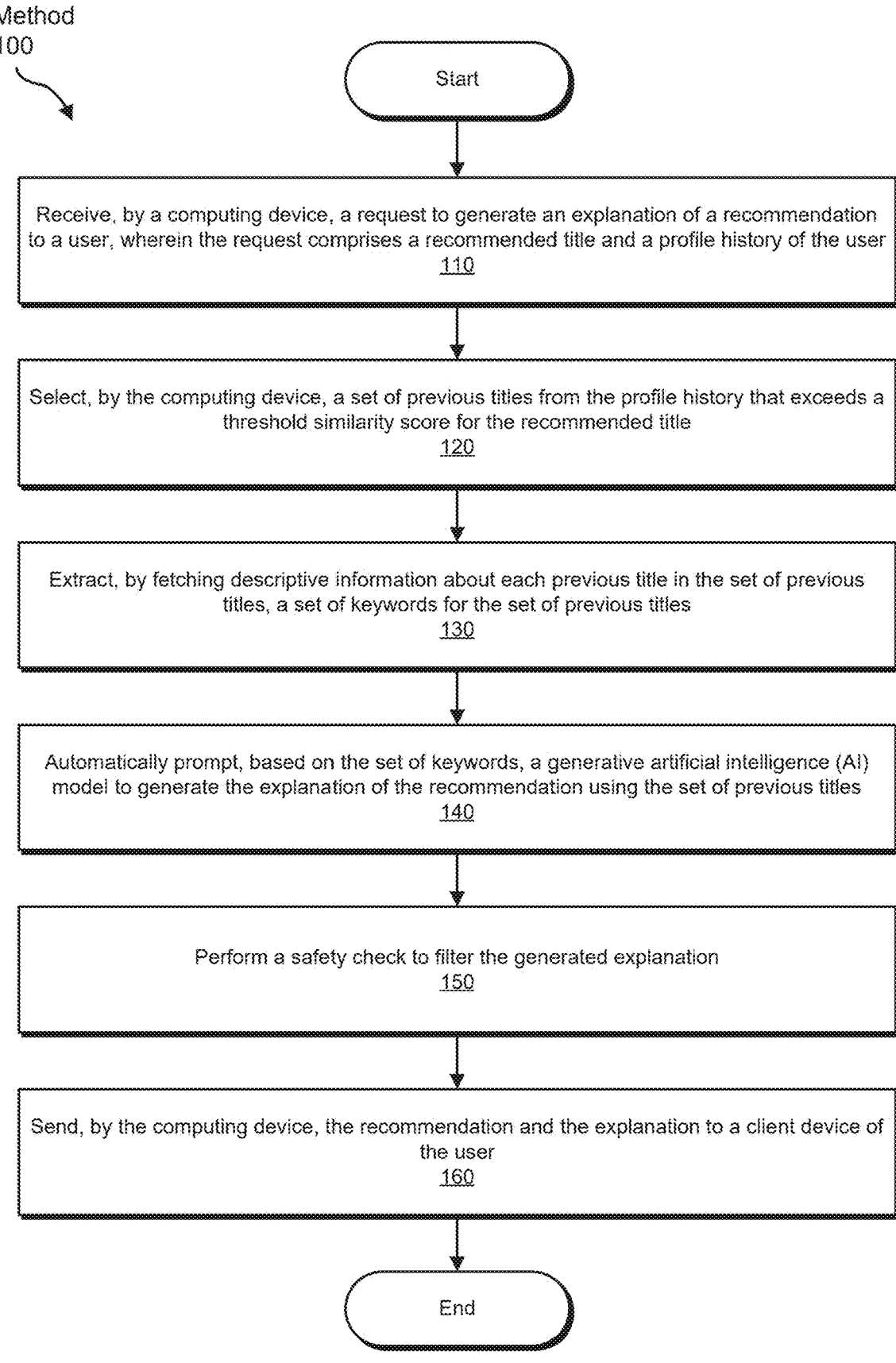

Start

Receive, by a computing device, a request to generate an explanation of a recommendation to a user, wherein the request comprises a recommended title and a profile history of the user
110

Select, by the computing device, a set of previous titles from the profile history that exceeds a threshold similarity score for the recommended title
120

Extract, by fetching descriptive information about each previous title in the set of previous titles, a set of keywords for the set of previous titles
130

Automatically prompt, based on the set of keywords, a generative artificial intelligence (AI) model to generate the explanation of the recommendation using the set of previous titles
140

Perform a safety check to filter the generated explanation
150

Send, by the computing device, the recommendation and the explanation to a client device of the user
160

End

*FIG. 1*

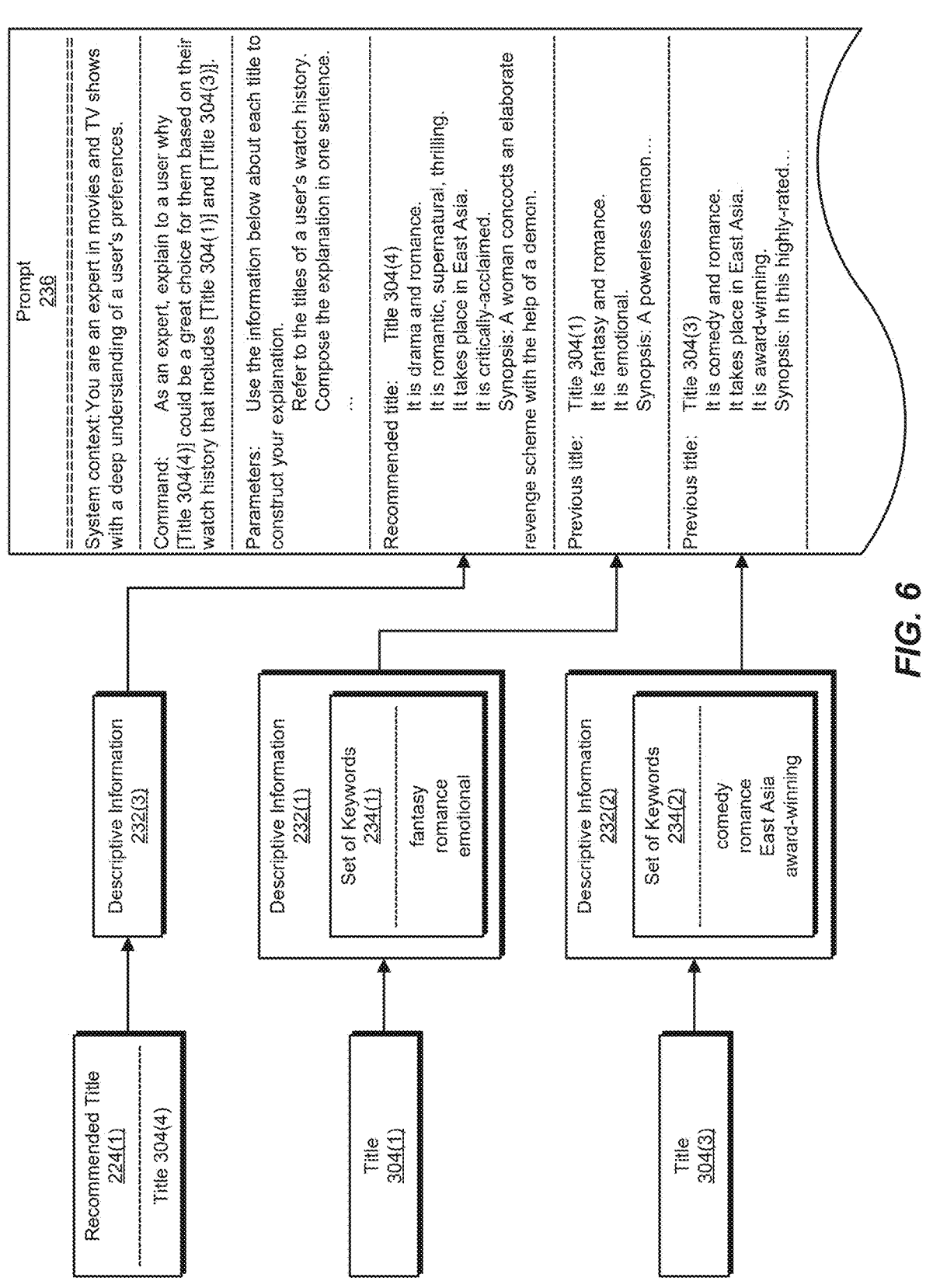

Prompt 236

System context: You are an expert in movies and TV shows with a deep understanding of a user's preferences.

Command:    As an expert, explain to a user why [Title 304(4)] could be a great choice for them based on their watch history that includes [Title 304(1)] and [Title 304(3)].

Parameters:    Use the information below about each title to construct your explanation.
Refer to the titles of a user's watch history.
Compose the explanation in one sentence.
...

Recommended title:    Title 304(4)
It is drama and romance.
It is romantic, supernatural, thrilling.
It takes place in East Asia.
It is critically-acclaimed.
Synopsis: A woman concocts an elaborate revenge scheme with the help of a demon.

Previous title:    Title 304(1)
It is fantasy and romance.
It is emotional.
Synopsis: A powerless demon...

Previous title:    Title 304(3)
It is comedy and romance.
It takes place in East Asia.
It is award-winning.
Synopsis: In this highly-rated...

Recommended Title 224(1)
Title 304(4)

Descriptive Information 232(3)

Descriptive Information 232(1)
Set of Keywords 234(1)
fantasy
romance
emotional

Title 304(1)

Descriptive Information 232(2)
Set of Keywords 234(2)
comedy
romance
East Asia
award-winning

Title 304(3)

*FIG. 6*

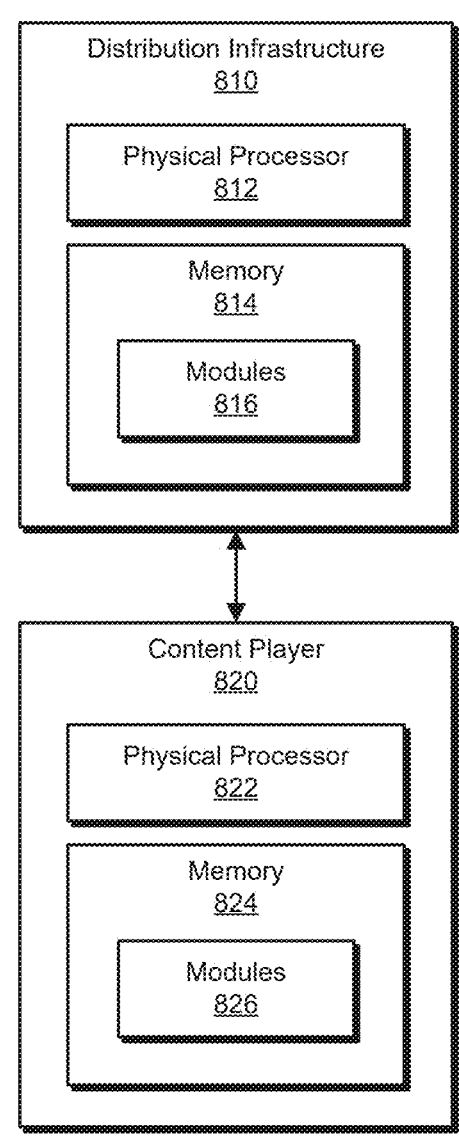
*FIG. 8*

SYSTEMS AND METHODS FOR GENERATING PERSONALIZED RECOMMENDATION EXPLANATIONS

BACKGROUND

For media platforms, recommender systems can help provide recommendations based on the previous media consumption of users. These recommendations can encourage users to explore new titles, such as a television show, a book, or a movie, that they may not have previously encountered. Automated recommendations often focus on what a title is, potentially with a description of the content or a synopsis. However, users often complain about not having enough information to choose between titles or not being able to understand why a title is recommended to them. Recommendations may need to feel accurate and engaging for users to believe them. Without a detailed explanation of why a title is recommended, users may avoid selecting titles that are unfamiliar or may lack trust that the titles are appropriate.

Although users may ask for more information about recommendations, too much information or irrelevant information can instead become overwhelming for users. Recommendations that list a large volume of information may also feel impersonal. In contrast, when one person recommends a title to another, they often describe the recommended media in terms of the other person's tastes. For example, someone may use elements of other familiar media to help contextualize the unfamiliar recommendation. When recommendations are automated, such as through the use of recommender systems, this type of context may be lost, making it difficult for users of such systems to understand or trust new recommendations. However, manually providing explanations for each recommendation can be a costly process for large numbers of users and recommended titles. Additionally, as new titles are added, new explanations need to be created for new recommendations, which may cost additional time and resources to generate. Thus, better methods of automating personalizing explanations of recommendations are needed to increase meaning without increasing the volume of information.

SUMMARY

As will be described in greater detail below, the present disclosure describes systems and methods for generating personalized recommendation explanations based on user history. In one example, a computer-implemented method for generating personalized recommendation explanations may include receiving, by a computing device, a request to generate an explanation of a recommendation to a user, wherein the request may include a recommended title and a profile history of the user. The method may also include selecting, by the computing device, a set of previous titles from the profile history that exceeds a threshold similarity score for the recommended title. In addition, the method may include extracting, by fetching descriptive information about each previous title in the set of previous titles, a set of keywords for the set of previous titles. The method may also include automatically prompting, based on the set of keywords, a generative artificial intelligence (AI) model to generate the explanation of the recommendation using the set of previous titles. Furthermore, the method may include performing a safety check to filter the generated explanation.

Finally, the method may include sending, by the computing device, the recommendation and the explanation to a client device of the user.

In one embodiment, the recommended title may include a title identifying a video recommended by a recommender system for the user.

In one example, the profile history of the user may include one or more of a viewing history of the user, a behavioral history of the user, a rating history of the user, and/or metadata about the user.

In some embodiments, selecting the set of previous titles may include calculating a similarity score for each title in a set of titles and determining the similarity score exceeds the threshold similarity score. In these embodiments, calculating the similarity score for a title may include calculating an initial score based on title embeddings trained by a machine learning model and adjusting the initial score based on a historical user interaction with the title. In these embodiments, calculating the similarity score for the title may further include predicting, by a predictive model, a user rating of the title based on the profile history of the user and adjusting the initial score based on the predicted user rating.

In some examples, the descriptive information about a previous title may include one or more of a category of the previous title and a synopsis of the previous title. In these examples, extracting the set of keywords may include extracting the set of keywords from at least one category and mapping each keyword of the set of keywords to at least a portion of a synopsis. In these examples, extracting the set of keywords may further include caching the mapping to a local memory. In the above examples, automatically prompting the generative AI model may include generating at least one prompt, based on the mapping of the set of keywords, to generate the explanation of the recommendation. Additionally, automatically prompting the generative AI model may include receiving, by querying the generative AI model with the at least one prompt, the explanation. In these examples, a prompt may include one or more of a system context, a command to generate the explanation of the recommendation using the set of previous titles, a parameter for generating the explanation, the mapping of the set of keywords, and/or an example explanation.

In one embodiment, performing the safety check may include identifying at least one risk guideline and evaluating the explanation based on the at least one risk guideline. In this embodiment, performing the safety check may further include determining that the explanation violates the at least one risk guideline and filtering the explanation to conform to the at least one risk guideline. In this embodiment, filtering the explanation may include removing a portion of the explanation that violates the at least one risk guideline and/or removing the explanation prior to sending the recommendation to the client device.

In one example, the computer-implemented method may further include preemptively prompting, by the computing device, the generative AI model to generate a set of explanations for a combination of titles. Additionally, the computer-implemented method may further include storing the set of explanations in a local memory and selecting the explanation from the set of explanations in response to receiving the request.

In addition, a corresponding system for generating personalized recommendation explanations may include several modules stored in memory, including a reception module that receives, by a computing device, a request to generate an explanation of a recommendation to a user, wherein the request may include a recommended title and a profile history of the user. The system may also include a selection module that selects, by the computing device, a set of previous titles from the profile history that exceeds a threshold similarity score for the recommended title. In addition, the system may include an extraction module that extracts, by fetching descriptive information about each previous title in the set of previous titles, a set of keywords for the set of previous titles. The system may also include a prompting module that automatically prompts, based on the set of keywords, a generative AI model to generate the explanation of the recommendation using the set of previous titles. Furthermore, the system may include a safety module that performs a safety check to filter the generated explanation. Additionally, the system may include a sending module that sends, by the computing device, the recommendation and the explanation to a client device of the user. Finally, the system may include one or more processors that execute the reception module, the selection module, the extraction module, the prompting module, the safety module, and the sending module.

In one embodiment, the sending module may send the recommendation and the explanation to the client device of the user by detecting, by the computing device, a user session connecting the client device to the system and displaying the recommendation and the explanation on the client device in response to a user action during the user session.

In one example, the prompting module may further automatically prompt the generative AI model to generate a set of explanations of the recommendation using the set of previous titles, and the sending module may further select the explanation from the set of explanations.

In some embodiments, the system may further include an aggregation module, stored in memory, that aggregates the request with at least one other request such that the sending module sends at least a portion of the explanation in response to the reception module receiving the at least one other request.

In some examples, the above-described method may be encoded as computer-readable instructions on a computer-readable medium. For example, a non-transitory computer-readable medium may include one or more computer-executable instructions that, when executed by at least one processor of a computing device, may cause the computing device to receive a request to generate an explanation of a recommendation to a user, wherein the request may include a recommended title and a profile history of the user. The instructions may also cause the computing device to select a set of previous titles from the profile history that exceeds a threshold similarity score for the recommended title. In addition, the instructions may cause the computing device to extract, by fetching descriptive information about each previous title in the set of previous titles, a set of keywords for the set of previous titles. The instructions may also cause the computing device to automatically prompt, based on the set of keywords, a generative AI model to generate the explanation of the recommendation using the set of previous titles. Furthermore, the instructions may cause the computing device to perform a safety check to filter the generated explanation. Finally, the instructions may cause the computing device to send the recommendation and the explanation to a client device of the user.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1 is a flow diagram of an exemplary method for generating personalized recommendation explanations.

FIG. 6 is a block diagram of an exemplary generation of an exemplary prompt.

FIG. 8 is a block diagram of an exemplary content distribution ecosystem.

Figure 2:
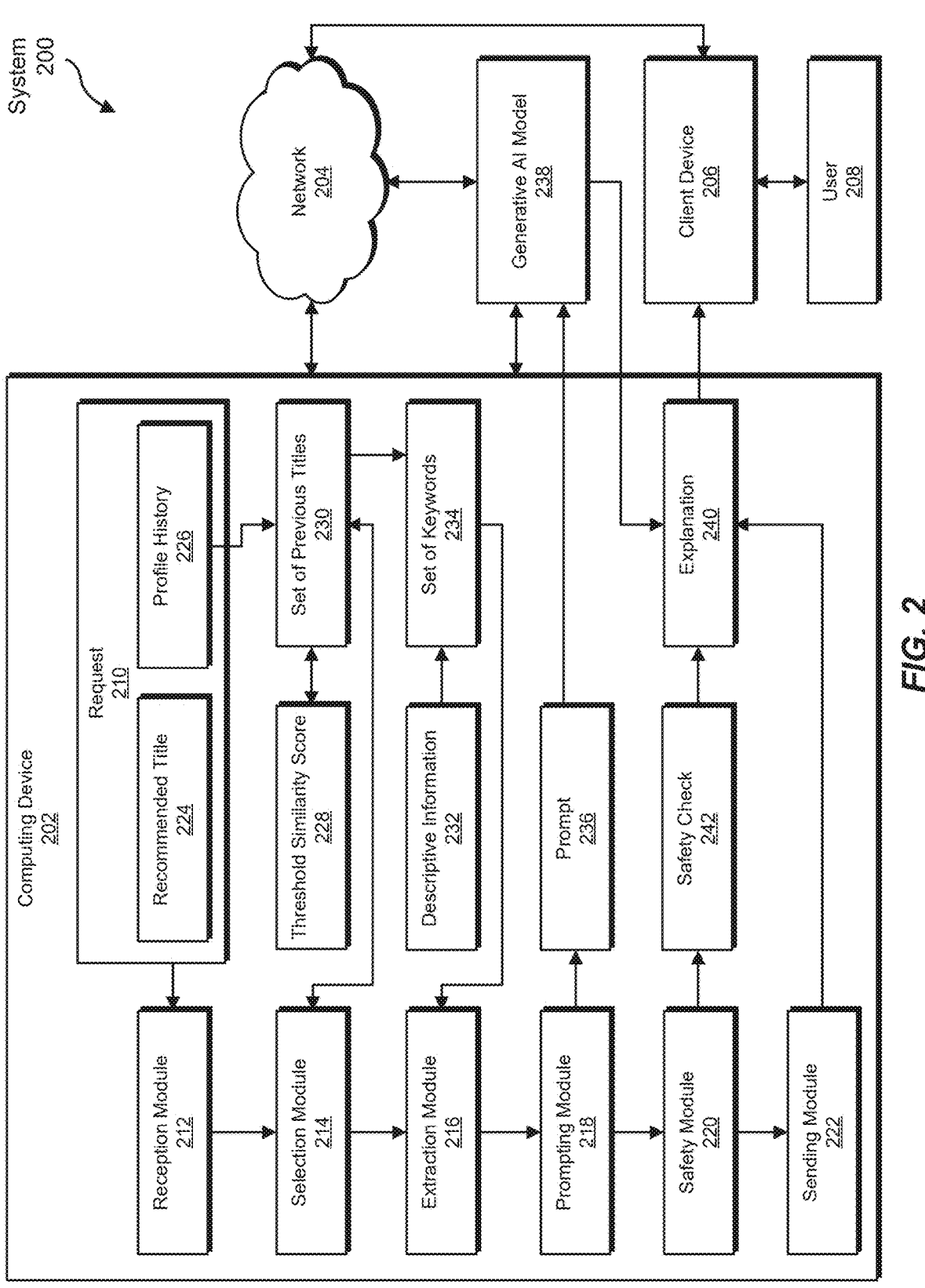
FIG. 2 is a block diagram of an exemplary computing system for generating personalized recommendation explanations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to automatically generating personalized explanations for recommendations. As will be explained in greater detail below, embodiments of the present disclosure may, by leveraging generative artificial intelligence (AI) capabilities, automate the generation of explanations with human-written quality for a large number of users and recommendations. The disclosed systems and methods may first evaluate a recommendation based on a user's profile history. For example, the disclosed systems and methods may select a set of previous titles from the user's profile history that are similar to the recommendation. In some examples, the disclosed systems and methods may calculate similarity scores for these previous titles using a machine learning model and then adjust the scores based on user history. For example, the systems and methods described herein may train the machine learning model with various information tags about each title and data about historical media consumption along with other titles. In this example, the systems and methods described herein may then evaluate whether a given user has enjoyed similar titles, such as by reviewing ratings or time spent consuming the media, to determine whether those titles are relevant. In addition, by fetching information about similar titles and extracting keywords from that information, the disclosed systems and methods may map useful keywords to descriptions, such as words or phrases in synopses of the titles.

The disclosed systems and methods may then use the recommendation and information about select similar titles to generate a prompt for a generative AI model. For example, the systems and methods described herein may prompt a large language model (LLM) to generate an explanation of the recommendation in terms associated with the similar titles by sending a mapping of keywords to synopses of the similar titles and keywords of the recommended title. Furthermore, the disclosed systems and methods may perform a safety check to ensure the generated explanation is reliable and does not violate risk guidelines. For example, the disclosed systems and methods may determine that the generated explanation is not understandable or contains harmful language and, subsequently, may remove all or a portion of the explanation. The disclosed systems and methods may then send the title recommendation and the personalized explanation to the user. By tailoring descriptions based on a user's past media consumption, the systems and methods described herein may increase trust and belief in new recommendations.

The systems and methods described herein may improve the functioning of a computing device by utilizing generative AI models to automate the generation of recommendation explanations, which may otherwise be slow and costly to perform for very large numbers of individual users and titles. For example, the disclosed systems and methods may use automatically generated recommendations to automatically select similar titles based on user history, and then automatically extract keywords that can be used to prompt an LLM for an explanation of the recommendation, which may be difficult to manually create given the volume of data and dynamically changing sets of users, titles, and user histories. The systems and methods described herein may then cache the results of processing title information to further reduce cost and latency in providing these recommendations and explanations to users. By performing a safety check on generated explanations, the disclosed systems and methods may also ensure that the results of generative AI do not pose a security threat to a computing system. In addition, these systems and methods may improve the fields of recommender systems and content platforms by providing richer contextualization and granular attributes to increase user trust in recommendations and enable users to spend less time browsing and to decide on titles faster. For example, the systems and methods described herein may improve the selection of related titles through machine learning and the prediction of user preferences to account for data sparsity. Thus, the disclosed systems and methods may improve over traditional methods of generating personalized recommendation explanations that either require more manual input or are less tailored to individual users.

Thereafter, the description will provide, with reference to FIG. 1, detailed descriptions of computer-implemented methods for generating personalized recommendation explanations. Detailed descriptions of a corresponding exemplary computing system will be provided in connection with FIG. 2. Detailed descriptions of exemplary requests for explanations of exemplary recommendations will be provided in connection with FIG. 3. In addition, detailed descriptions of an exemplary selection of titles based on exemplary similarity scores will be provided in connection with FIG. 4. Detailed descriptions of an exemplary mapping of keywords to exemplary synopses will be provided in connection with FIG. 5. Furthermore, detailed descriptions of an exemplary generation of an exemplary prompt will be provided in connection with FIG. 6. Additionally, detailed descriptions of an exemplary safety check of an exemplary explanation of a recommendation will be provided in connection with FIG. 7.

Because many of the embodiments described herein may be used with substantially any type of computing network, including distributed networks designed to provide video content to a worldwide audience, various computer network and video distribution systems will initially be described with reference to FIGS. 8-10. These figures will introduce the various networks and distribution methods used to provision video content to users.

FIG. 1 is a flow diagram of an exemplary computer-implemented method 100 for generating personalized recommendation explanations. The steps shown in FIG. 1 may be performed by any suitable computer-executable code and/or computing system, including the systems illustrated in FIGS. 8-10, computing device 202 in FIG. 2, or a combination of one or more of the same. In one example, each of the steps shown in FIG. 1 may represent an algorithm whose structure includes and/or is represented by multiple sub-steps, examples of which will be provided in greater detail below. In some examples, all of the steps and sub-steps represented in FIG. 1 may be performed by one device (e.g., either a server or a client computing device). Alternatively, the steps and/or substeps represented in FIG. 1 may be performed across multiples devices (e.g., some of steps and/or sub-steps may be performed by a server and other steps and/or sub-steps may be performed by a client computing device).

As illustrated in FIG. 1, at step 110, one or more of the systems described herein may receive, by a computing device, a request to generate an explanation of a recommendation to a user, wherein the request may include a recommended title and a profile history of the user. For example, FIG. 2 is a block diagram of an exemplary system 200 for generating personalized recommendation explanations. As illustrated in FIG. 2, a reception module 212 may, as part of a computing device 202, receive a request 210 to generate an explanation 240 of a recommendation to a user 208, wherein request 210 includes a recommended title 224 and a profile history 226 of user 208.

In some embodiments, computing device 202 may generally represent a device capable of processing user and title data to generate prompts for explanations of recommendations for a content hosting platform. Computing device 202 may alternatively generally represent any type or form of server that is capable of storing and/or managing content and user data, such as profile history 226 and/or videos for a video hosting platform. Examples of a server include, without limitation, security servers, application servers, web servers, storage servers, streaming servers, and/or database servers configured to run certain software applications and/or to provide various security, web, storage, streaming, and/or database services. Additionally, computing device 202 may include distribution infrastructure 810 and/or various other components of FIGS. 8-10.

Although illustrated as part of computing device 202 in FIG. 2, some or all of the modules described herein may alternatively be executed by a separate server or any other suitable computing device. For example, computing device

202 may represent a separate device for creating a prompt to send to a server that executes a generative AI model to generate explanation 240 or, alternatively, may represent a single device to perform both prompt creation and generation of explanation 240.

In the above embodiments, computing device 202 may be directly in communication with other servers and/or in communication with other computing devices, such as a client device 206, via a network, such as a network 204 of FIG. 2. In some examples, the term "network" may refer to any medium or architecture capable of facilitating communication or data transfer. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), network 930 of FIG. 9, or any other suitable network. For example, network 204 may facilitate data transfer between computing device 202 and client device 206 using wireless or wired connections and between computing device 202 and a device hosting a generative AI model 238. The term "generative AI," as used herein, generally refers to artificial intelligence or machine learning techniques used to learn patterns from data and generate new and/or similar data based on the learning. In some examples, generative AI models may be hosted on independent servers and/or on an online platform for generative AI applications. In some examples, the terms "machine learning" and "machine learning model" may refer to a computational algorithm that may learn from data in order to make predictions. Examples of machine learning models may include, without limitation, support vector machines, neural networks, clustering models, decision trees, classifiers, variations or combinations of one or more of the same, and/or any other suitable model. In other examples, generative AI models may be hosted on computing device 202 or another device of system 200 and/or may be smaller and faster to reduce processing costs and latency.

In some examples, client device 206 may generally represent any type or form of computing device capable of running computing software and applications. As used herein, the term "application" generally refers to a software program designed to perform specific functions or tasks and capable of being installed, deployed, executed, and/or otherwise implemented on a computing system. Examples of applications may include, without limitation, playback application 1010 of FIG. 10, productivity software, enterprise software, entertainment software, security applications, cloud-based applications, web applications, mobile applications, content access software, simulation software, integrated software, application packages, application suites, variations or combinations of one or more of the same, and/or any other suitable software application. Examples of client devices may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device. Additionally, client devices may include content player 820 in FIGS. 8 and 10 and/or various other components of FIGS. 8-10.

The systems described herein may perform step 110 in a variety of ways. In some embodiments, recommended title 224 of request 210 may include a title identifying a video recommended by a recommender system for user 208. In some examples, the term "recommender system" may refer to a system or algorithm that performs information processing to provide suggestions based on individual needs. For example, recommender systems may use machine learning methods as part of a content discovery platform to recommend content tailored to individual users.

In some embodiments, profile history 226 of user 208 may include one or more of a viewing history of user 208, a behavioral history of user 208, a rating history of user 208, and/or metadata about user 208. In the example of a video hosting platform, the viewing history may include information about previous videos watched by user 208 (e.g., when a video was first watched, viewing recency, total viewing time of a video or title), the behavioral history may include how user 208 interacted with various videos and/or the video hosting platform, the rating history may include ratings by user 208 that indicate liking or disliking videos (e.g., scale rating, thumbs up or down), and the metadata may include demographic or user account information about user 208. In some examples, profile history 226 may include all user history for user 208. In other examples, profile history 226 may be limited to a specific time frame, such as the most recent two years, to account for current user preferences. In these examples, the time frame may be determined based on similar users, changes in user history, system testing, and/or any other appropriate methods.

Figure 3:
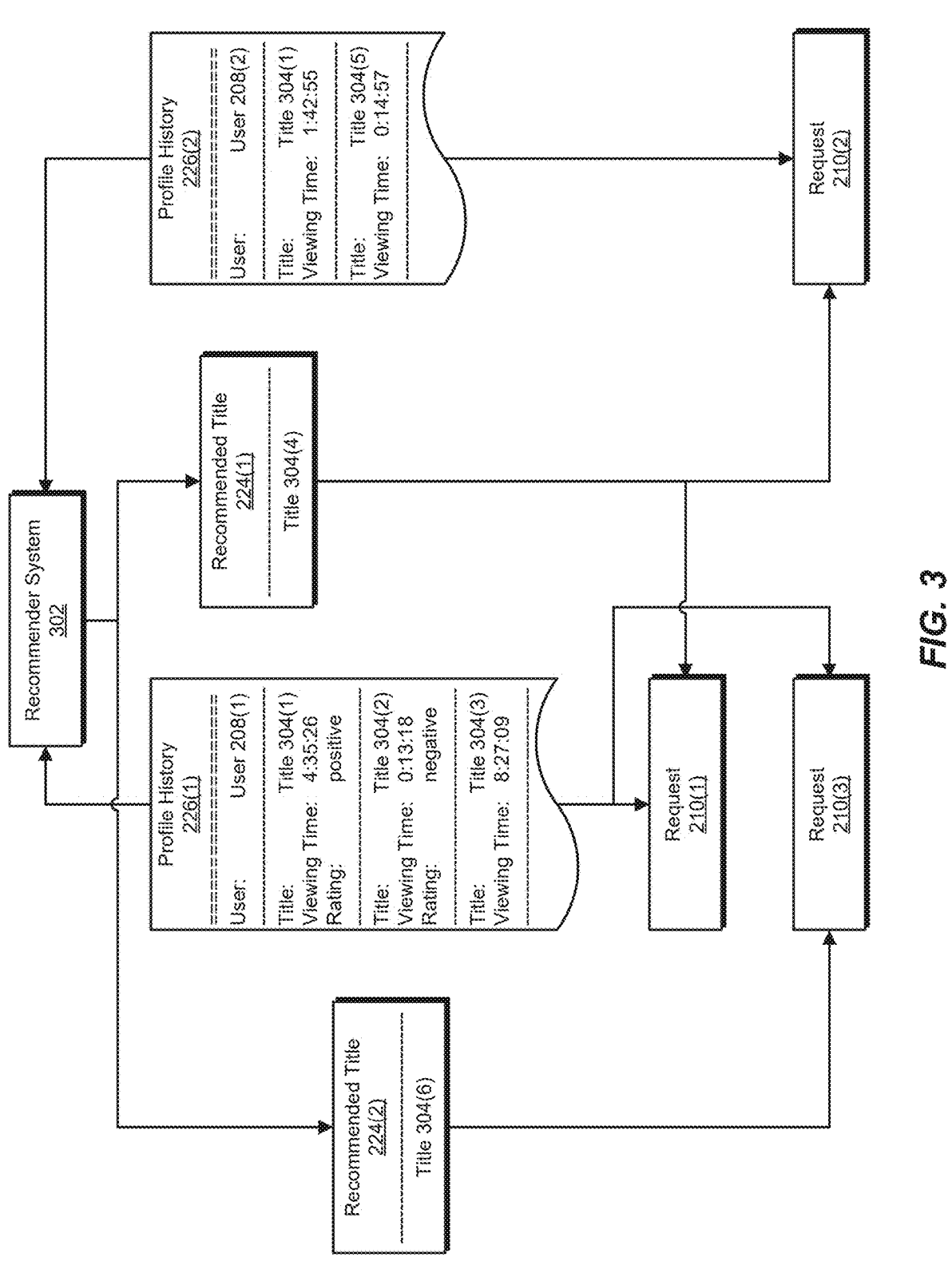
FIG. 3 is a block diagram of exemplary requests for explanations of exemplary recommendations.

In the example of FIG. 3, a recommender system 302 may process a profile history 226(1) of a user 208(1) and a profile history 226(2) of a user 208(2) to analyze previously viewed titles 304(1)-(3) for user 208(1) and titles 304(1) and 304(5) for user 208(2). In this example, recommender system 302 may then recommend a recommended title 224(1), which may include a title 304(4), to user 208(1) and user 208(2) and a recommended title 224(2), which may include a title 304(6), to user 208(1). For example, recommender system 302 may suggest title 304(4) to user 208(1) based on user 208(1) viewing title 304(1) and positively rating it. Similarly, recommender system 302 may suggest title 304(4) to user 208(2) based on also viewing title 304(1) for a threshold viewing time, such as viewing over 50% of the content. In contrast, recommender system 302 may recommend title 304(6) to user 208(1) but not to user 208(2) based on only user 208(1) viewing title 304(3). In this example, recommender system 302 may then generate a request 210(1), which may include profile history 226(1), to explain the recommendation of recommended title 224(1) for user 208(1). Similarly, a request 210(2) including profile history 226(2) may be received by computing device 202 of FIG. 2 for recommended title 224(1) for user 208(2), and a request 210(3) including profile history 226(1) may be received for recommended title 224(2) for user 208(1). In other words, each recommended title for each user may generate a request to explain why that particular title is recommended to that particular user.

Returning to FIG. 1, at step 120, one or more of the systems described herein may select, by the computing device, a set of previous titles from the profile history that exceeds a threshold similarity score for the recommended title. For example, a selection module 214 may, as part of computing device 202 in FIG. 2, select a set of previous titles 230 from profile history 226 that exceeds a threshold similarity score 228 for recommended title 224.

The systems described herein may perform step 120 in a variety of ways. In some examples, selection module 214 may select set of previous titles 230 by calculating a similarity score for each title in a set of titles and determining whether the similarity score of each title exceeds threshold similarity score 228. In these examples, calculating the similarity score for a title may include calculating an initial score based on title embeddings trained by a machine learning model and adjusting the initial score based on a historical user interaction with the title. The term "embedding," as used herein, generally refers to a representation of a value or a type of object and/or data that can be used by machine learning models. For example, a title embedding may represent data on co-viewing of titles that indicates how often users watch both of two titles, data on descriptive tags associated with each title to find similar tags, and/or any other types of data or combinations of data representing each title. In this example, using a combination of data may improve both precision and recall of machine learning models, particularly for sparse data such as for newly added titles or less popularly watched titles.

In some examples, calculating the similarity score for each title may further include predicting, by a predictive model, a user rating of the title based on the profile history of the user, such as profile history 226 of user 208, and adjusting the initial score based on the predicted user rating. In these examples, the predictive model may include a machine learning model and/or any other suitable model for predicting patterns. In these examples, the predictive model may provide predicted user ratings when actual rating information is sparse.

Figure 4:
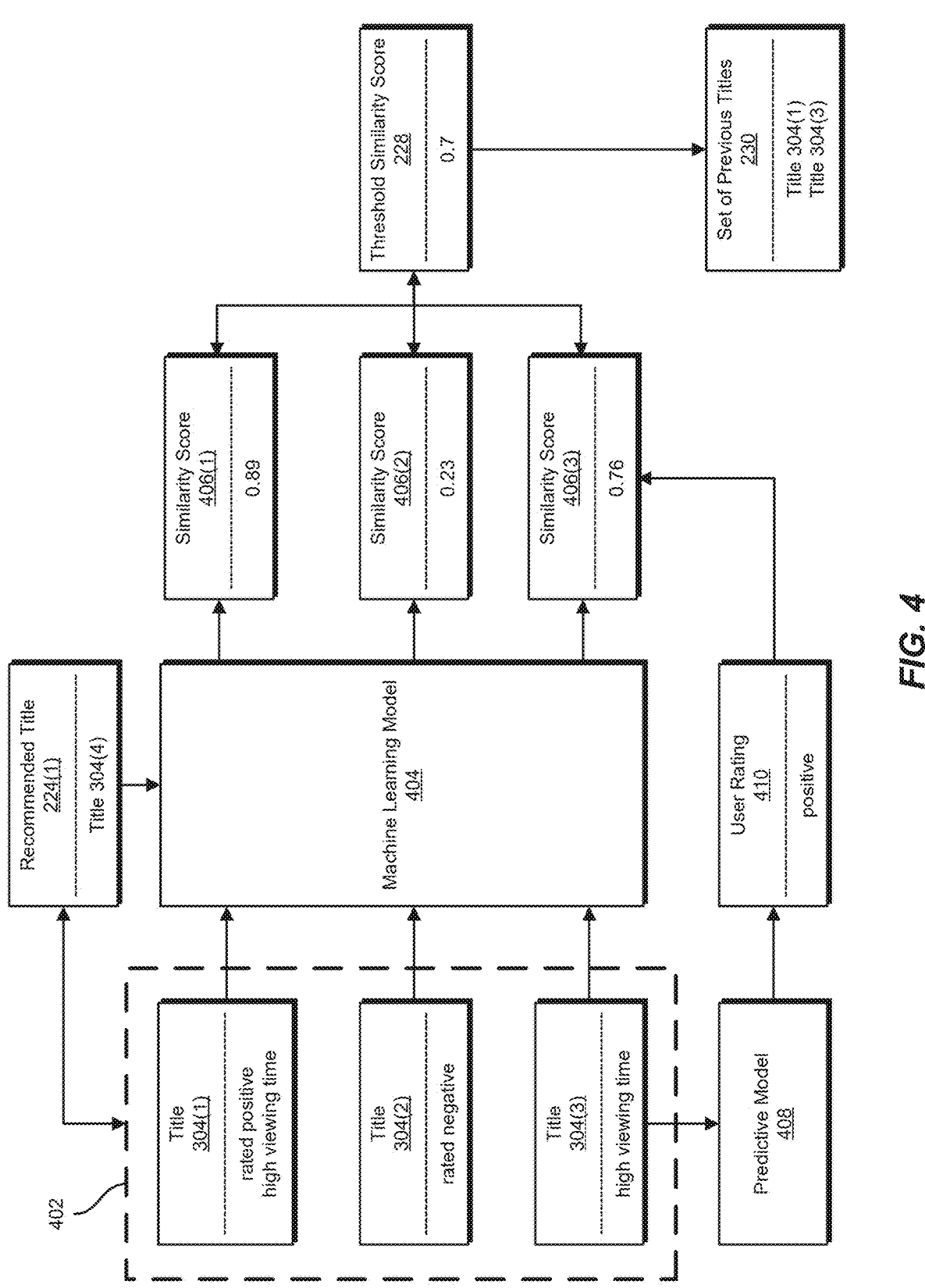
FIG. 4 is a block diagram of an exemplary selection of titles based on exemplary similarity scores.

As illustrated in FIG. 4, a set of titles 402 may include titles 304(1)-(3). In this example, a machine learning model 404 may calculate similarity scores 406(1)-(3) corresponding to each of titles 304(1)-(3) to indicate a similarity to recommended title 224(1), which includes title 304(4). In this example, machine learning model 404 may be trained based on a combination of co-viewing data from various users and tags for titles 304(1)-(4). Additionally, based on historical user interactions with titles 304(1)-(3), similarity scores 406(1)-(3) may be adjusted. For example, based on a historical interaction indicating user 208(1) of FIG. 3 rated title 304(2) negatively, similarity score 406(2) may be decreased to avoid using title 304(2) in descriptions of recommendations for user 208(1). Similarly, based on a high viewing time and positive rating of title 304(1), similarity score 406(1) may be increased. In other words, if a user explicitly indicates dislike of a title, such as by selecting a thumbs down option, selection module 214 may not select the title for use in explanations. In contrast, explicit indications of liking a title may increase the chance of selection module 214 selecting the title. For example, machine learning model 404 may determine that title 304(3) is more similar than title 304(1) to recommended title 224(1), but explicit positive rating of title 304(1) may adjust similarity score 406(1) to increase the ranking of title 304(1) to be selected before title 304(3) for set of previous titles 230.

In the example of FIG. 4, a predictive model 408 may predict a user rating 410 of title 304(3) based on profile history 226(1) of FIG. 3 indicating a very high viewing time of title 304(3) by user 208(1). In this example, predictive model 408 may determine that user 208(1) likely enjoyed title 304(3) and would have giving a positive rating, which may increase similarity score 406(3) to increase the likelihood of selecting title 304(3) for use in explanations. In another example, predictive model 408 may predict user rating 410 based on user ratings for other titles viewed by user 208(1) and/or user ratings of title 304(3) by other users.

Additionally, in the example of FIG. 4, similarity scores 406(1)-(3) may be compared to threshold similarity score 228 to select set of previous titles 230. In this example, title 304(1) and title 304(3) may have similarity scores that exceed threshold similarity score 228 to be selected for set of previous titles 230. In other example, selection module 214 may select a set number of titles based on a ranking of similarity scores. For example, selection module 214 may select two titles with the highest two similarity scores for use in explaining the recommendation of title 304(4). By selecting a number of titles to use in explanations rather than a single title, the disclosed systems may provide more context to increase trust in a recommendation. Alternatively, with more limited titles or profile history 226, selection module 214 may select a single most similar title.

In the above examples, set of previous titles 230 may also be restricted to titles that user 208(1) has previously viewed or titles with which user 208(1) has otherwise interacted, such as by adding to a watch list, thereby providing a familiar frame of reference for user 208(1). For example, similarity scores may be calculated to indicate a similarity of each title on a content platform to other titles, and selection module 214 may filter out titles not watched by user 208(1), titles disliked by user 208(1), and/or other title attributes that may be less useful for providing explanations. In other words, selection module 214 may select set of previous titles 230 based on a combination of the similarity to recommended title 224(1) and user engagement with each title. For example, selection module 214 may rank titles by user ratings and predicted ratings, then by a fraction of viewing time to total content time, and then by viewing duration. In this example, titles with low user ratings and/or with less than 50% of content viewed may be excluded. Similarly, with a limited time frame, titles viewed earlier than the time frame may be filtered out from eligible titles. In some examples, no titles may be selected, such as for new users with sparse profile histories. In these examples, recommendations may be provided with no personalized explanations and/or by using profile histories of other users, such as by recommending popular titles.

Returning to FIG. 1, at step 130, one or more of the systems described herein may extract, by fetching descriptive information about each previous title in the set of previous titles, a set of keywords for the set of previous titles. For example, an extraction module 216 may, as part of computing device 202 in FIG. 2, extract, by fetching descriptive information 232 about each previous title in set of previous titles 230, a set of keywords 234.

The systems described herein may perform step 130 in a variety of ways. As used herein, the term "fetch" generally refers to a process of retrieving data, such as from a database or storage device. In the example of FIG. 2, extraction module 216 may fetch descriptive information 232 from a local memory of computing device 202 and/or storage on a separate device or server, such as memory 814 of FIG. 8 and/or storage 910 of FIG. 9.

In one embodiment, descriptive information 232 about a previous title may include one or more categories of the previous title and/or one or more synopses of the previous title. For example, descriptive information 232 may include descriptive tags and multiple synopses pre-written or pre-generated for a specific title. In some examples, the one or more synopses may include human-written synopses used to describe a plot of a title. In some examples, categories may include contextual information such as genre, format, actors or cast, plot elements, tone, quality evaluations, and/or any other suitable information.

In some embodiments, extraction module 216 may extract set of keywords 234 by extracting set of keywords 234 from one or more categories and mapping each keyword to at least a portion of a synopsis. As used herein, the term "keyword" generally refers to a word or a phrase that acts as a discrete unit of description. For example, each keyword describing a genre of a title may be mapped to specific words or phrases in a synopsis that indicate the genre. In some examples, a generative AI model or large language model may be used to perform the mapping. The term "large language model," as used herein, generally refers to a machine-learning model for processing or classifying natural language. In one embodiment, extraction module 216 may further extract set of keywords 234 by caching the mapping to a local memory. The term "caching," as used herein, generally refers to a process of storing data in a temporary storage, or "cache," to provide faster access. In some examples, results of prompting an LLM may be cached to pre-process title information and mapping for titles prior to receiving request 210.

Figure 5:
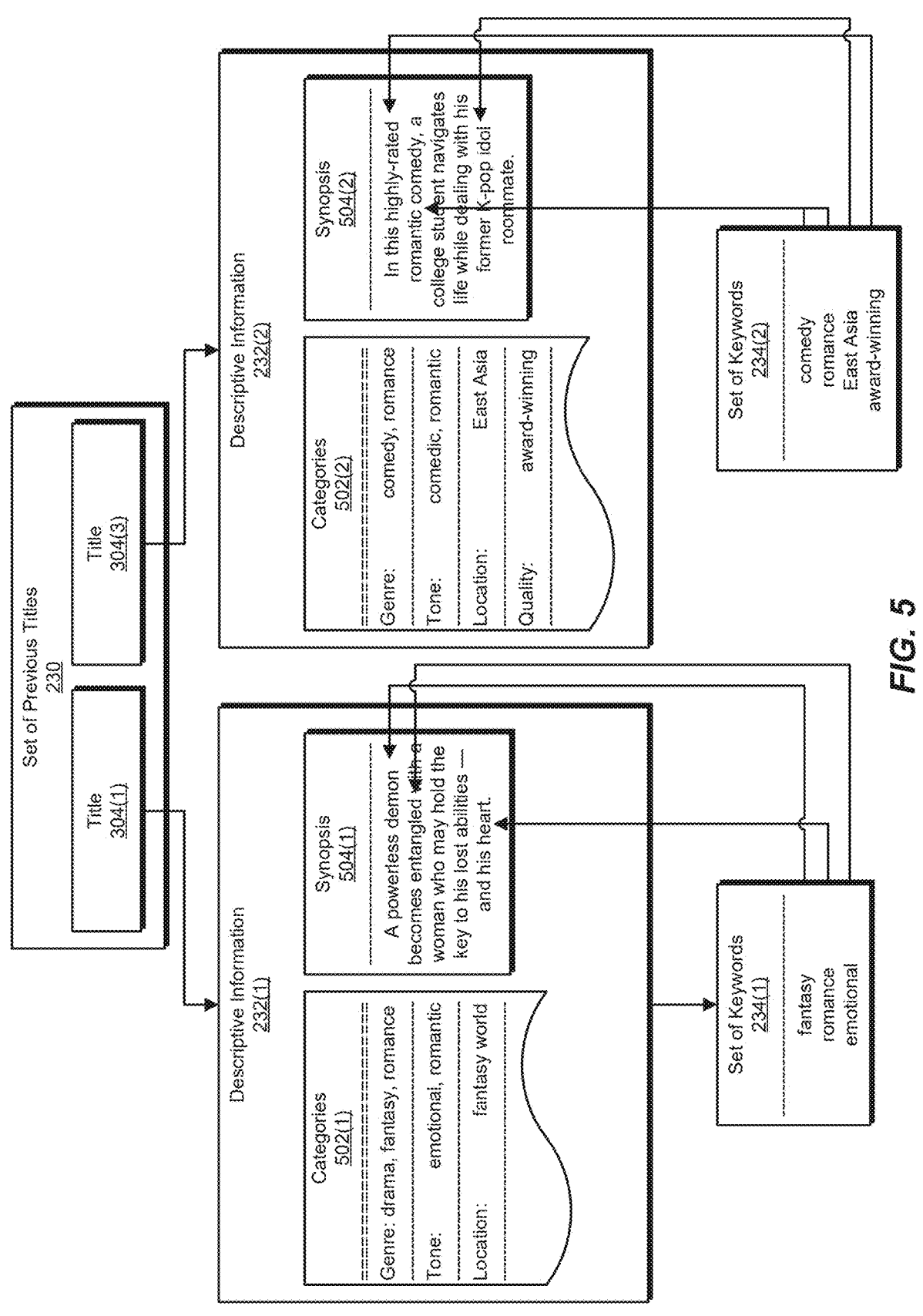
FIG. 5 is a block diagram of an exemplary mapping of keywords to exemplary synopses.

As illustrated in FIG. 5, extraction module 216 may fetch descriptive information 232(1) and 232(2) for titles 304(1) and 304(3), respectively, in set of previous titles 230. In this example, categories 502(1) for title 304(1) may include various types of information such as genre, tone, and location of a story. In this example, extraction module 216 may extract a set of keywords 234(1) and map each keyword to a portion of a synopsis 504(1). For example, the genre of "fantasy" may be mapped to a description of "a powerless demon," "romance" may be mapped to "heart," and the "emotional" tone may be mapped to the word "entangled." In the example of FIG. 5, categories 502(2) for title 304(3) may include similar information, and extraction module 216 may extract a set of keywords 234(2) with mapping to a synopsis 504(2). In these examples, keywords and tags of categories 502(1)-(2) that are unable to be mapped to words or phrases in synopses may be excluded from sets of keywords 234(1)-(2). In alternate examples, each keyword or tag derived from categories 502(1)-(2) may be included in sets of keywords 234(1)-(2), with mapping of only some keywords to synopses 504(1)-(2) where possible.

Returning to FIG. 1, at step 140, one or more of the systems described herein may automatically prompt, based on the set of keywords, a generative AI model to generate the explanation of the recommendation using the set of previous titles. For example, a prompting module 218 may, as part of computing device 202 in FIG. 2, automatically prompt, based on set of keywords 234, generative AI model 238 to generate explanation 240 of the recommendation using set of previous titles 230.

The systems described herein may perform step 140 in a variety of ways. In some examples, generative AI model 238 may include an LLM that uses a prompt 236 as input and outputs explanation 240 based on prompt parameters. In these examples, prompting module 218 may automatically prompt generative AI model 238 by generating one or more prompts, such as prompt 236, based on the mapping of set of keywords 234. In these examples, prompting module 218 may receive, by querying generative AI model 238 with the one or more prompts, explanation 240. In some examples, prompt 236 may include one or more of a system context, a command to generate explanation 240 using set of previous titles 230, a parameter for generating explanation 240, the mapping of set of keywords 234, and/or an example explanation.

As illustrated in FIG. 6, prompting module 218 may automatically generate prompt 236 using descriptive information 232(1) and 232(2), which includes sets of keywords 234(1)-(2), for titles 304(1) and 304(3). In this example, prompting module 218 may also use descriptive information 232(3) for recommended title 224(1). For example, descriptive information 232(3) may include tags and synopses associated with title 304(4), with keywords similar to keywords in sets of keywords 234(1)-(2). In this example, prompt 236 may then include system context to describe a scenario for recommendations, with a command to generate an explanation for recommending title 304(4) based on information about titles 304(1) and 304(3). Additionally, prompt 236 may include various parameters to further guide and restrict the explanation, such as by defining the length of the explanation, how to present the explanation, details to include in the explanation, a preferred format or style, and/or other attributes that may improve readability or trust for users. In these examples, prompt 236 may then include descriptive information about recommended title 224(1) and separate information about each previous title, such as descriptive information 232(1)-(2) about titles 304(1) and 304(3). For example, as shown in FIG. 6, prompt 236 may include each keyword in set of keywords 234(2) as well as the mapped synopsis, such as synopsis 504(2) of FIG. 5, for title 304(3). In additional examples, prompt 236 may include specific examples of explanations as further guidelines.

Figure 7:
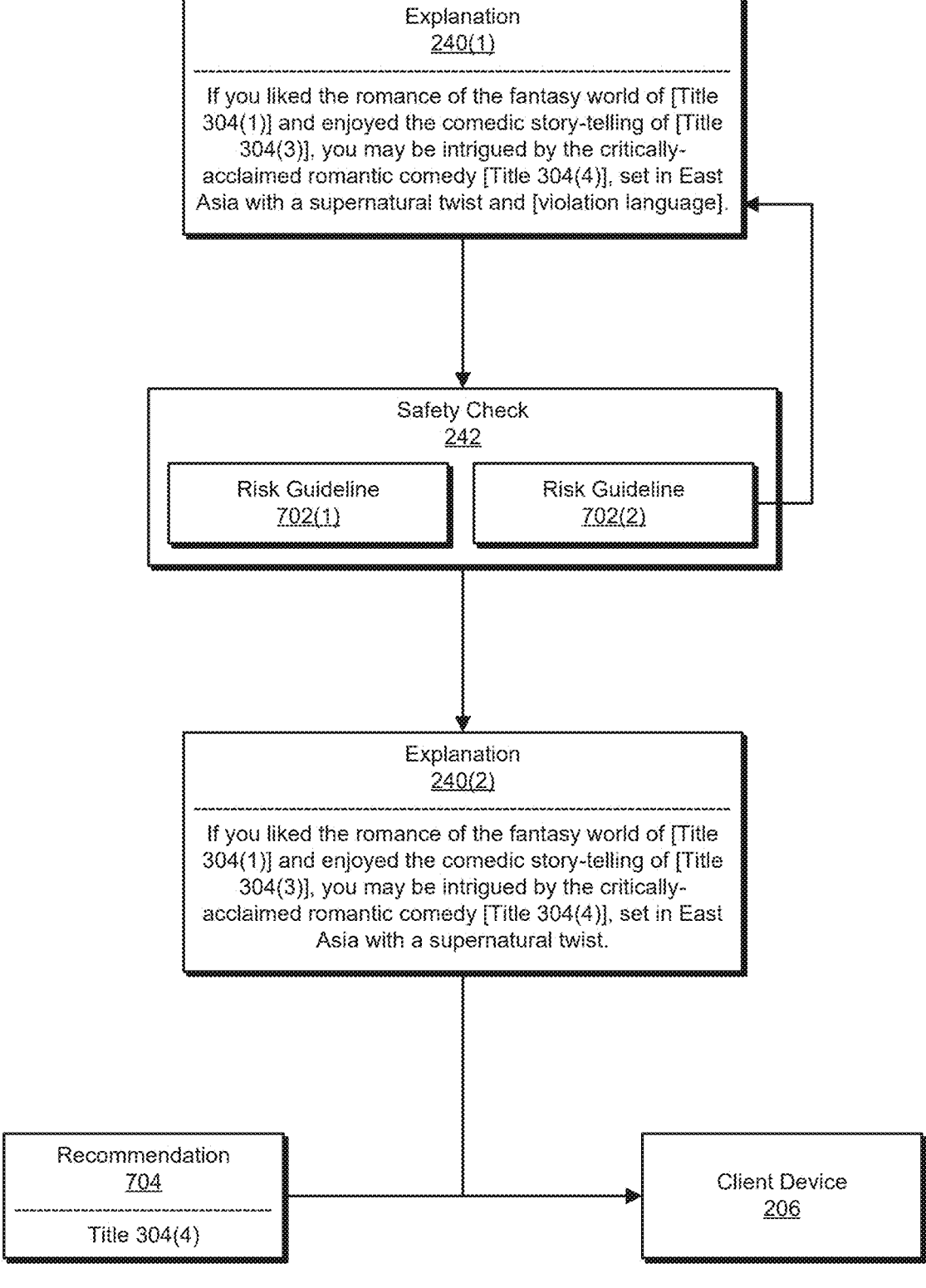
FIG. 7 is a block diagram of an exemplary safety check of an exemplary explanation of a recommendation.

In the example of FIG. 7, an explanation 240(1) may be generated for recommended title 224(1) based on prompt 236 of FIG. 6. In this example, based on the mapping of set of keywords 234(1) to synopsis 504(1) and the mapping of set of keywords 234(2) to synopsis 504(2), prompt 236 may generate explanation 240(1) to include similar words and phrases from synopses 504(1)-(2) given similar keywords and/or synopses used to describe title 304(4). For example, based on the mapping of the keyword "fantasy" to the phrase "a powerful demon" in synopsis 504(1) of FIG. 5 and the similar word "demon" in the synopsis of title 304(4) in FIG. 6, explanation 240(1) may include a description of title 304(1) as a "fantasy world" to provide an example of a similar attribute between title 304(1) and title 304(4) that may help explain the recommendation of title 304(4).

In some embodiments, prompting module 218 may automatically prompt generative AI model 238 to generate a set of explanations of the recommendation using set of previous titles 230. In these embodiments, prompting module 218 may prompt generative AI model 238 to generate multiple explanations from which a single explanation may be selected for user 208. In other embodiments, prompting module 218 may automatically generate multiple prompts to send to generative AI model 238. By generating multiple explanations, the disclosed systems and methods may then evaluate informativeness, accuracy of similarity, level of personalization, and/or other metrics to select a best explanation. By evaluating explanations, prompting module 218 may improve the creation of prompts for better results.

Returning to FIG. 1, at step 150, one or more of the systems described herein may perform a safety check to filter the generated explanation. For example, a safety module 220 may, as part of computing device 202 in FIG. 2, perform a safety check 242 to filter explanation 240.

The systems described herein may perform step 150 in a variety of ways. In some examples, safety module 220 may perform safety check 242 by identifying one or more risk guidelines and evaluating explanation 240 based on the one or more risk guidelines. For example, risk guidelines may include guidelines for technical security risks, identification of harmful language in explanation 240, identification of nonsensical language in explanation 240, inaccuracies or bias in explanation 240, and/or other potential risks to system 200, computing device 202, client device 206, and/or user 208. In the above examples, safety module 220 may then determine that explanation 240 violates one or more risk guidelines and filter explanation 240 to conform to the risk guidelines. In these examples, safety module 220 may filter explanation 240 by removing a portion of explanation 240 that violates one or more risk guidelines and/or by removing explanation 240 prior to sending the recommendation to client device 206. In some examples, safety check 242 may be performed entirely by computing device 202. In other examples, safety module 220 may utilize other software, applications, or models to perform safety check 242. For example, system 200 may utilize a model hosted by a remote server to perform safety check 242 and decrease processor utilization of local computing device 202. In another example, prompt 236 may include a request for generative AI model 238 to perform all or a portion of safety check 242.

As shown in FIG. 7, safety check 242 may determine explanation 240(1) meets a risk guideline 702(1) but includes violation language that violates a risk guideline 702(2). In this example, safety module 220 of FIG. 2 may then filter explanation 240(1) to remove the violation language and create an explanation 240(2) that meets all risk guidelines. In other examples, safety module 220 may remove the entirety of explanation 240(1), such as for violations that make explanation 240(2) difficult to understand or that necessitates removal of too much content. In the example of generating multiple explanations above, safety module 220 may instead evaluate each of the multiple explanations and select an alternate explanation that meets all risk guidelines.

Returning to FIG. 1, at step 160, one or more of the systems described herein may send, by the computing device, the recommendation and the explanation to a client device of the user. For example, a sending module 222 may, as part of computing device 202 in FIG. 2, send the recommendation and explanation 240 to client device 206.

The systems described herein may perform step 160 in a variety of ways. In some embodiments, sending module 222 may send the recommendation and explanation 240 to client device 206 by detecting a user session connecting client device 206 to system 200 and displaying the recommendation and explanation 240 on client device 206 in response to a user action during the user session. For example, while user 208 is browsing titles on a content hosting platform, sending module 222 may display recommended title 224 and explanation 240 as part of the user interface shown on client device 206. As another example, when user 208 finishes watching a video, such as a title in set of previous titles 230, on client device 206, sending module 222 may send recommended title 224 and explanation 240 to be displayed on client device 206 as a recommendation for what to watch next. In the example of FIG. 7, sending module 222 may send filtered explanation 240(2) and a recommendation 704 to client device 206. In the example of generating multiple explanations, sending module 222 may select an explanation from a set of explanations and then send the selected explanation to client device 206 along with recommended title 224.

In some embodiments, the above described methods may further include preemptively prompting generative AI model 238 to generate a set of explanations for a combination of titles, storing the set of explanations in a local memory of computing device 202, and selecting explanation 240 from the set of explanations in response to receiving request 210. For example, to reduce cost and latency associated with prompting generative AI model 238, the disclosed systems may preemptively generate explanations for each title using descriptions of combinations of other titles, store all explanations for later use, and select the appropriate explanation for a given combination of recommended title 224 and set of previous titles 230 upon receiving request 210. In these embodiments, the disclosed systems may preemptively generate multiple explanations for each combination in order to provide a more diverse set of explanations with different phrasing and may select one explanation for request 210.

In some examples, the above described systems and/or computing device 202 may further include an aggregation module, stored in memory, that aggregates request 210 with one or more other requests such that sending module 222 sends at least a portion of explanation 240 in response to reception module 212 receiving the one or more other requests. In these examples, the disclosed systems may determine that some recommendations are similar, such as recommendations of the same title to multiple users with similar profile histories. In these examples, the aggregation module may aggregate or group multiple requests to utilize the same or similar phrasing for explanations. For example, the aggregation module may first summarize user preferences for each user based on their profile histories and then use the summary to explain the recommendations. In other examples, the aggregation module may use other metrics, such as popularity of titles or trending titles, to generate explanations that may pertain to multiple users. In these various examples, the aggregation module may aggregate requests and/or explanations to reduce processing and latency for faster results.

As explained above in connection with method 100 in FIG. 1, the disclosed systems and methods may, by formulating an explanation connecting a user's viewed titles with a recommended target title, build trust in recommendations with enhanced personalization of explanations. Specifically, the disclosed systems and methods may first use information about a recommended title and a profile history of the user to select a set of previous titles familiar to the user. For example, the disclosed systems and methods may evaluate the similarity of a recommended title to previous content consumed by the user. By extracting a set of keywords for the set of previous titles, the systems and methods described herein may select important words that are descriptive of the titles in ways that users can understand and that describe granular attributes. Additionally, by mapping the keywords to synopses of the titles, the systems and methods described herein may identify more natural language used to describe titles, with words that are more detailed, descriptive, or unique, and/or that capture a user's attention.

The disclosed systems and methods may then prompt a generative AI model to generate an explanation for recommending a title based on previous titles consumed by the user. For example, the systems and methods described herein may prompt an LLM to explain a title recommendation with language to describe similarities between the recommended title and other titles familiar to the user, based on mapping of keywords to synopses. In other words, by generating explanations tied to previously enjoyed content, the disclosed systems and methods may contextualize the explanation of a recommendation. Additionally, the systems and methods described herein may preemptively generate explanations and store them locally to service requests for explanations faster. Thus, the systems and methods described herein may improve trust in recommender systems and provide more personalized explanations to make content selection easier for users.

Content that is created or modified using the methods described herein may be used and/or distributed in a variety of ways and/or by a variety of systems. Such systems may include content distribution ecosystems, as shown in FIGS. 8-10.

FIG. 8 is a block diagram of a content distribution ecosystem 800 that includes a distribution infrastructure 810 in communication with a content player 820. In some embodiments, distribution infrastructure 810 may be configured to encode data and to transfer the encoded data to content player 820 via data packets. Content player 820 may be configured to receive the encoded data via distribution infrastructure 810 and to decode the data for playback to a user. The data provided by distribution infrastructure 810 may include audio, video, text, images, animations, interactive content, haptic data, virtual or augmented reality data, location data, gaming data, or any other type of data that may be provided via streaming.

Distribution infrastructure 810 generally represents any services, hardware, software, or other infrastructure components configured to deliver content to end users. For example, distribution infrastructure 810 may include content aggregation systems, media transcoding and packaging services, network components (e.g., network adapters), and/or a variety of other types of hardware and software. Distribution infrastructure 810 may be implemented as a highly complex distribution system, a single media server or device, or anything in between. In some examples, regardless of size or complexity, distribution infrastructure 810 may include at least one physical processor 812 and at least one memory device 814. One or more modules 816 may be stored or loaded into memory 814 to enable adaptive streaming, as discussed herein.

Content player 820 generally represents any type or form of device or system capable of playing audio and/or video content that has been provided over distribution infrastructure 810. Examples of content player 820 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 810, content player 820 may include a physical processor 822, memory 824, and one or more modules 826. Some or all of the adaptive streaming processes described herein may be performed or enabled by modules 826, and in some examples, modules 816 of distribution infrastructure 810 may coordinate with modules 826 of content player 820 to provide adaptive streaming of multimedia content.

In certain embodiments, one or more of modules 816 and/or 826 in FIG. 8 may represent one or more software applications or programs that, when executed by a computing device, may cause the computing device to perform one or more tasks. For example, and as will be described in greater detail below, one or more of modules 816 and 826 may represent modules stored and configured to run on one or more general-purpose computing devices. One or more of modules 816 and 826 in FIG. 8 may also represent all or portions of one or more special-purpose computers configured to perform one or more tasks.

Physical processors 812 and 822 generally represent any type or form of hardware-implemented processing unit capable of interpreting and/or executing computer-readable instructions. In one example, physical processors 812 and 822 may access and/or modify one or more of modules 816 and 826, respectively. Additionally or alternatively, physical processors 812 and 822 may execute one or more of modules 816 and 826 to facilitate adaptive streaming of multimedia content. Examples of physical processors 812 and 822 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 814 and 824 generally represent any type or form of volatile or non-volatile storage device or medium capable of storing data and/or computer-readable instructions. In one example, memory 814 and/or 824 may store, load, and/or maintain one or more of modules 816 and 826. Examples of memory 814 and/or 824 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 9:
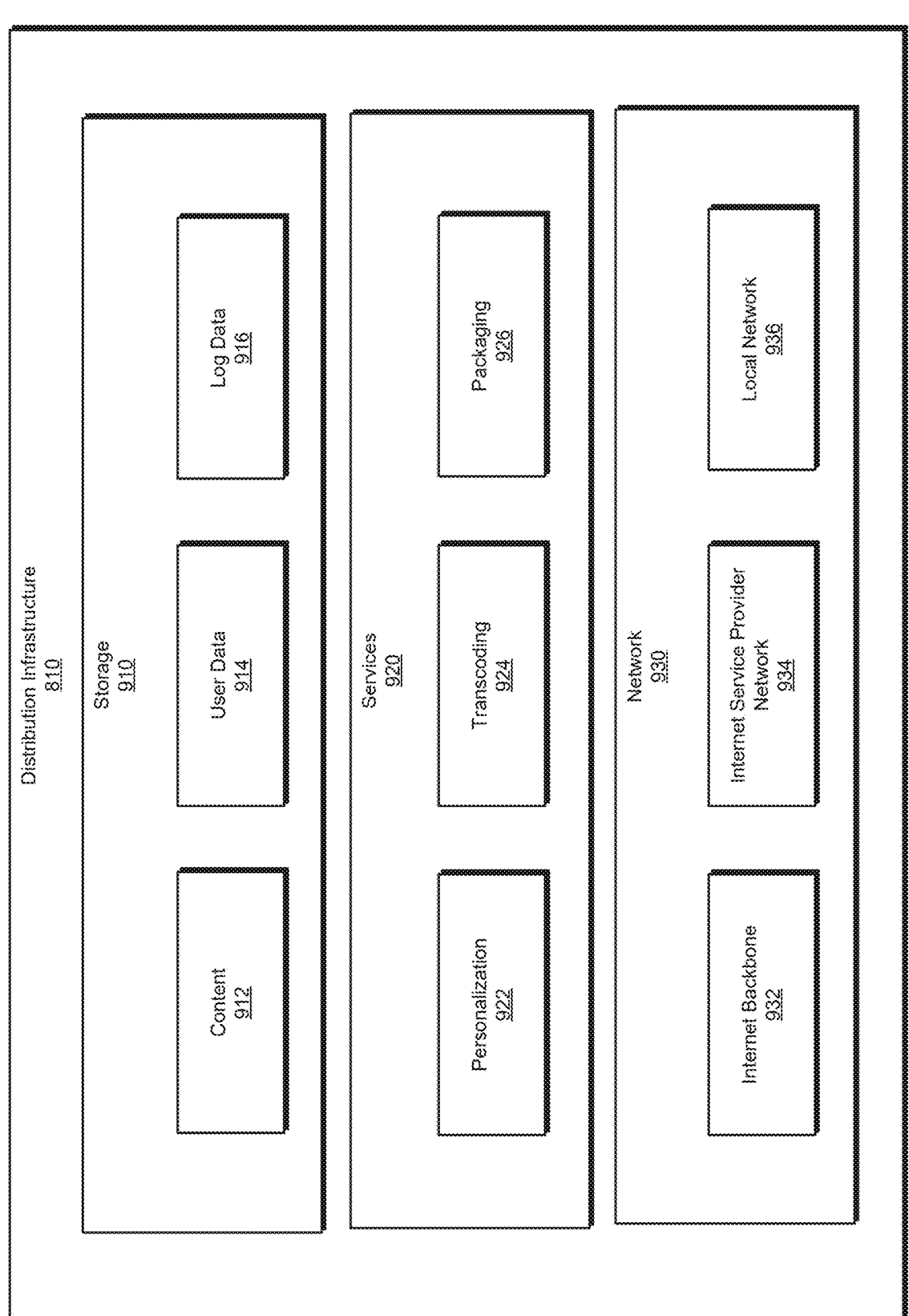
FIG. 9 is a block diagram of an exemplary distribution infrastructure within the content distribution ecosystem shown in FIG. 8.

FIG. 9 is a block diagram of exemplary components of content distribution infrastructure 810 according to certain embodiments. Distribution infrastructure 810 may include storage 910, services 920, and a network 930. Storage 910 generally represents any device, set of devices, and/or systems capable of storing content for delivery to end users. Storage 910 may include a central repository with devices capable of storing terabytes or petabytes of data and/or may include distributed storage systems (e.g., appliances that mirror or cache content at Internet interconnect locations to provide faster access to the mirrored content within certain regions). Storage 910 may also be configured in any other suitable manner.

As shown, storage 910 may store, among other items, content 912, user data 914, and/or log data 916. Content 912 may include television shows, movies, video games, user-generated content, and/or any other suitable type or form of content. User data 914 may include personally identifiable information (PII), payment information, preference settings, language and accessibility settings, and/or any other information associated with a particular user or content player. Log data 916 may include viewing history information, network throughput information, and/or any other metrics associated with a user's connection to or interactions with distribution infrastructure 810.

Services 920 may include personalization services 922, transcoding services 924, and/or packaging services 926. Personalization services 922 may personalize recommendations, content streams, and/or other aspects of a user's experience with distribution infrastructure 810. Encoding services, such as transcoding services 924, may compress media at different bitrates which may enable real-time switching between different encodings. Packaging services 926 may package encoded video before deploying it to a delivery network, such as network 930, for streaming.

Network 930 generally represents any medium or architecture capable of facilitating communication or data transfer. Network 930 may facilitate communication or data transfer via transport protocols using wireless and/or wired connections. Examples of network 930 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 9, network 930 may include an Internet backbone 932, an internet service provider 934, and/or a local network 936.

Figure 10:
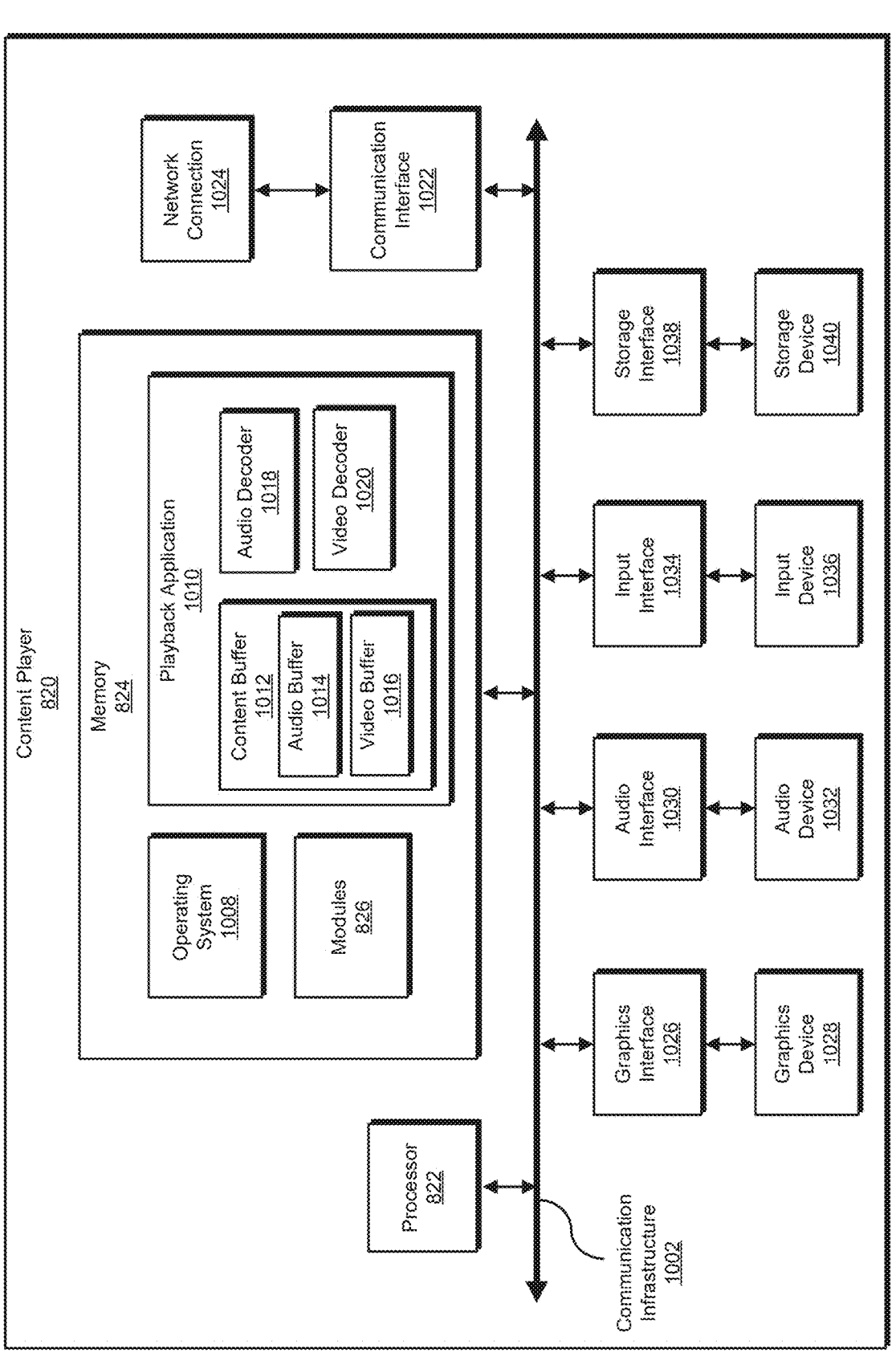
FIG. 10 is a block diagram of an exemplary content player within the content distribution ecosystem shown in FIG. 8.

FIG. 10 is a block diagram of an exemplary implementation of content player 820 of FIG. 8. Content player 820 generally represents any type or form of computing device capable of reading computer-executable instructions. Content player 820 may include, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 10, in addition to processor 822 and memory 824, content player 820 may include a communication infrastructure 1002 and a communication interface 1022 coupled to a network connection 1024. Content player 820 may also include a graphics interface 1026 coupled to a graphics device 1028, an audio interface 1030 coupled to an audio device 1032, an input interface 1034 coupled to an input device 1036, and a storage interface 1038 coupled to a storage device 1040.

Communication infrastructure 1002 generally represents any type or form of infrastructure capable of facilitating communication between one or more components of a computing device. Examples of communication infrastructure 1002 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 824 generally represents any type or form of volatile or non-volatile storage device or medium capable of storing data and/or other computer-readable instructions. In some examples, memory 824 may store and/or load an operating system 1008 for execution by processor 822. In one example, operating system 1008 may include and/or represent software that manages computer hardware and software resources and/or provides common services to computer programs and/or applications on content player 820.

Operating system 1008 may perform various system management functions, such as managing hardware components (e.g., graphics interface 1026, audio interface 1030, input interface 1034, and/or storage interface 1038). Operating system 1008 may also process memory management models for playback application 1010. The modules of playback application 1010 may include, for example, a content buffer 1012, an audio decoder 1018, and a video decoder 1020.

Playback application 1010 may be configured to retrieve digital content via communication interface 1022 and play the digital content through graphics interface 1026. A video decoder 1020 may read units of video data from audio buffer 1014 and/or video buffer 1016 and may output the units of video data in a sequence of video frames corresponding in duration to the fixed span of playback time. Reading a unit of video data from video buffer 1016 may effectively dequeue the unit of video data from video buffer 1016. The sequence of video frames may then be rendered by graphics interface 1026 and transmitted to graphics device 1028 to be displayed to a user.

In situations where the bandwidth of distribution infrastructure 810 is limited and/or variable, playback application 1010 may download and buffer consecutive portions of video data and/or audio data from video encodings with different bit rates based on a variety of factors (e.g., scene complexity, audio complexity, network bandwidth, device capabilities, etc.). In some embodiments, video playback quality may be prioritized over audio playback quality. Audio playback and video playback quality may also be balanced with each other, and in some embodiments audio playback quality may be prioritized over video playback quality.

Content player 820 may also include a storage device 1040 coupled to communication infrastructure 1002 via a storage interface 1038. Storage device 1040 generally represent any type or form of storage device or medium capable of storing data and/or other computer-readable instructions. For example, storage device 1040 may be a magnetic disk drive, a solid-state drive, an optical disk drive, a flash drive, or the like. Storage interface 1038 generally represents any type or form of interface or device for transferring data between storage device 1040 and other components of content player 820.

Many other devices or subsystems may be included in or connected to content player 820. Conversely, one or more of the components and devices illustrated in FIG. 10 need not be present to practice the embodiments described and/or illustrated herein. The devices and subsystems referenced above may also be interconnected in different ways from that shown in FIG. 10. Content player 820 may also employ any number of software, firmware, and/or hardware configurations.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive title information to be transformed, transform the title information to generate keywords, output a result of the transformation to create a prompt, use the result of the transformation to prompt a generative AI model for an explanation of a recommendation, and store the result of the transformation to service client devices of a content platform. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving, by a computing device, a request to generate an explanation of a recommendation to a user, wherein the request comprises a recommended title and a profile history of the user;

selecting, by the computing device, a set of previous titles from the profile history that exceeds a threshold similarity score for the recommended title;
extracting, by fetching descriptive information about each previous title in the set of previous titles, a set of keywords for the set of previous titles;
automatically prompting, based on the set of keywords, a generative artificial intelligence (AI) model to generate the explanation of the recommendation using the set of previous titles;
performing a safety check to filter the generated explanation; and
sending, by the computing device, the recommendation and the explanation to a client device of the user.

2. The method of claim 1, wherein the recommended title comprises a title identifying a video recommended by a recommender system for the user.

3. The method of claim 1, wherein the profile history of the user comprises at least one of:
a viewing history of the user;
a behavioral history of the user;
a rating history of the user; or
metadata about the user.

4. The method of claim 1, wherein selecting the set of previous titles comprises:
calculating a similarity score for each title in a set of titles; and
determining the similarity score exceeds the threshold similarity score.

5. The method of claim 4, wherein calculating the similarity score for a title comprises:
calculating an initial score based on title embeddings trained by a machine learning model; and
adjusting the initial score based on a historical user interaction with the title.

6. The method of claim 5, wherein calculating the similarity score for the title further comprises:
predicting, by a predictive model, a user rating of the title based on the profile history of the user; and
adjusting the initial score based on the predicted user rating.

7. The method of claim 1, wherein the descriptive information about a previous title comprises at least one of:
a category of the previous title; and
a synopsis of the previous title.

8. The method of claim 7, wherein extracting the set of keywords comprises:
extracting the set of keywords from at least one category; and
mapping each keyword of the set of keywords to at least a portion of a synopsis.

9. The method of claim 8, wherein extracting the set of keywords further comprises caching the mapping to a local memory.

10. The method of claim 8, wherein automatically prompting the generative AI model comprises:
generating at least one prompt, based on the mapping of the set of keywords, to generate the explanation of the recommendation; and
receiving, by querying the generative AI model with the at least one prompt, the explanation.

11. The method of claim 10, wherein a prompt comprises at least one of:
a system context;
a command to generate the explanation of the recommendation using the set of previous titles;
a parameter for generating the explanation;

the mapping of the set of keywords; or an example explanation.

12. The method of claim 1, wherein performing the safety check comprises:

identifying at least one risk guideline; and evaluating the explanation based on the at least one risk guideline.

13. The method of claim 12, wherein performing the safety check further comprises:

determining that the explanation violates the at least one risk guideline; and filtering the explanation to conform to the at least one risk guideline.

14. The method of claim 13, wherein filtering the explanation comprises at least one of:

removing a portion of the explanation that violates the at least one risk guideline; or removing the explanation prior to sending the recommendation to the client device.

15. The method of claim 1, further comprising:

preemptively prompting, by the computing device, the generative AI model to generate a set of explanations for a combination of titles;

storing the set of explanations in a local memory; and selecting the explanation from the set of explanations in response to receiving the request.

16. A system comprising:

a reception module, stored in memory, that receives, by a computing device, a request to generate an explanation of a recommendation to a user, wherein the request comprises a recommended title and a profile history of the user;

a selection module, stored in memory, that selects, by the computing device, a set of previous titles from the profile history that exceeds a threshold similarity score for the recommended title;

an extraction module, stored in memory, that extracts, by fetching descriptive information about each previous title in the set of previous titles, a set of keywords for the set of previous titles;

a prompting module, stored in memory, that automatically prompts, based on the set of keywords, a generative artificial intelligence (AI) model to generate the explanation of the recommendation using the set of previous titles;

a safety module, stored in memory, that performs a safety check to filter the generated explanation;

a sending module, stored in memory, that sends, by the computing device, the recommendation and the explanation to a client device of the user; and at least one processor that executes the reception module, the selection module, the extraction module, the prompting module, the safety module, and the sending module.

17. The system of claim 16, wherein the sending module sends the recommendation and the explanation to the client device of the user by:

detecting, by the computing device, a user session connecting the client device to the system; and displaying the recommendation and the explanation on the client device in response to a user action during the user session.

18. The system of claim 16, further comprising:

the prompting module automatically prompting the generative AI model to generate a set of explanations of the recommendation using the set of previous titles; and the sending module selecting the explanation from the set of explanations.

19. The system of claim 16, further comprising an aggregation module, stored in memory, that aggregates the request with at least one other request such that the sending module sends at least a portion of the explanation in response to the reception module receiving the at least one other request.

20. A non-transitory computer-readable medium comprising one or more computer-executable instructions that, when executed by at least one processor of a computing device, cause the computing device to:

receive, by the computing device, a request to generate an explanation of a recommendation to a user, wherein the request comprises a recommended title and a profile history of the user;

select, by the computing device, a set of previous titles from the profile history that exceeds a threshold similarity score for the recommended title;

extract, by fetching descriptive information about each previous title in the set of previous titles, a set of keywords for the set of previous titles;

automatically prompt, based on the set of keywords, a generative artificial intelligence (AI) model to generate the explanation of the recommendation using the set of previous titles;

perform a safety check to filter the generated explanation; and send, by the computing device, the recommendation and the explanation to a client device of the user.

* * * * *